(12) United States Patent
Albrecht

(10) Patent No.: US 6,169,650 B1
(45) Date of Patent: Jan. 2, 2001

(54) SINGLE ACCESS CONTROL SYSTEM AND METHOD

(76) Inventor: John M. Albrecht, 6038 N. 81st St., Scottsdale, AZ (US) 85250

(*) Notice: Under 35 U.S.C. 154(b), the term of this patent shall be extended for 0 days.

(21) Appl. No.: 09/075,443

(22) Filed: May 11, 1998

(51) Int. Cl.[7] .......................... E05B 11/00; H01H 47/00
(52) U.S. Cl. ............................ 361/171; 361/172; 70/389
(58) Field of Search ................................. 361/144, 143, 361/170, 171, 172; 307/9.1, 10.1–10.6; 70/389, 277

(56) References Cited

U.S. PATENT DOCUMENTS

| | | | |
|---|---|---|---|
| 3,787,714 | * 1/1974 | Resnick et al. | 361/172 |
| 3,896,345 | * 7/1975 | Zink | 361/172 |
| 4,053,939 | * 10/1977 | Nakauchi et al. | 361/171 |
| 4,546,266 | * 10/1985 | Zenick et al. | 307/10.2 |
| 4,734,693 | * 3/1988 | Dluhosch et al. | 340/825.31 |
| 4,848,115 | * 7/1989 | Clarkson et al. | 70/276 |
| 4,855,720 | * 8/1989 | Donovan | 340/571 |

* cited by examiner

Primary Examiner—Jeffrey Gaffin
Assistant Examiner—Kim Huynh
(74) Attorney, Agent, or Firm—Gunn, Lee & Keeling

(57) ABSTRACT

A way of controlling access to golf cart starter keys, (referred herein as user-keys) is described. A specially coded and specially shaped key, the user-key is given to a golf cart renter once an appropriate rental fee has been paid. In order to start the golf cart, the renter must insert the user-key into a control unit, which is located in the dashboard. When the user-key is properly inserted, the golf cart starts. Furthermore, the user-key is locked inside the control unit and can no longer be removed by the renter, thereby preventing the renters from misappropriating the user-key. When the renter completes the round of golf, he returns the golf cart, along with the unremovable user-key, to the golf club. Only the specially coded removal key in the golf club's possession can remove the user-key from the control unit.

16 Claims, 6 Drawing Sheets

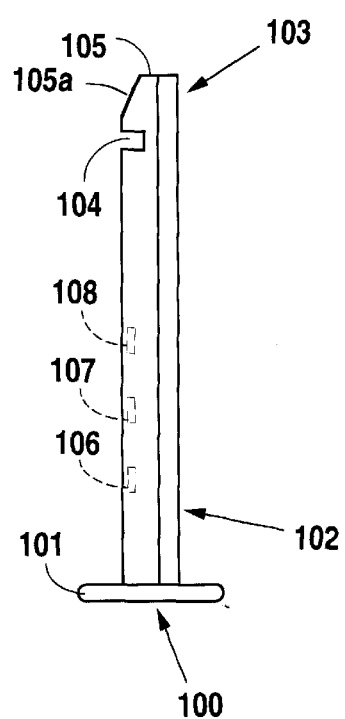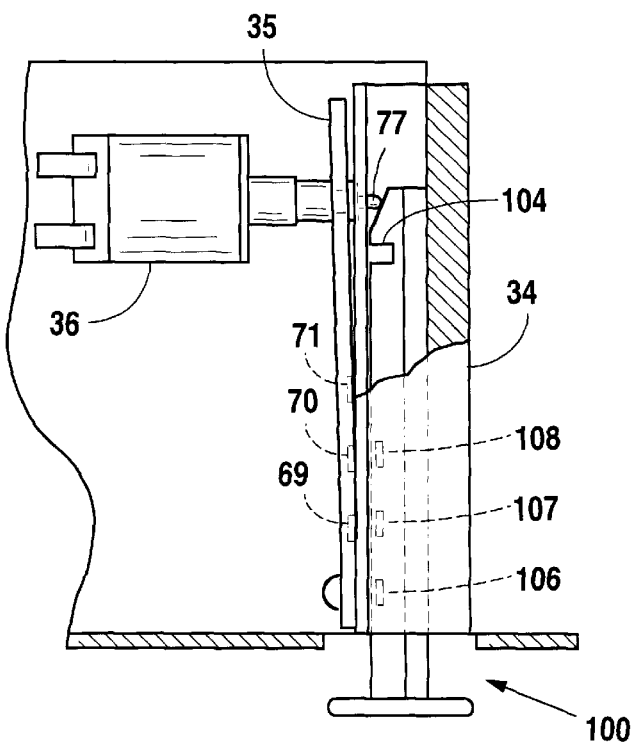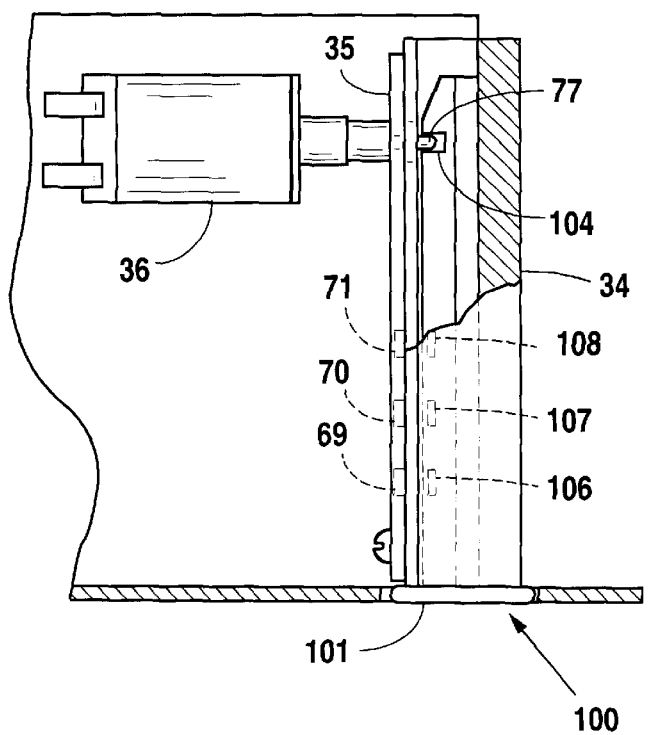

SINGLE ACCESS CONTROL SYSTEM AND METHOD

BACKGROUND OF THE INVENTION

1. Field of The Invention

Applicant's invention relates to the field access control devices. Specifically, applicant's invention is a novel method of access control for golf carts.

2. Background Information

Currently, access to golf carts are controlled by metal keys. Individuals obtain a metal key after paying the golf cart rental fee. However, golfers often fail to return the keys after finishing their rounds. Sometimes, the keys are simply forgotten and left in the cart. Other times, renters deliberately remove the keys so that they can keep and/or duplicate the keys for future free access to the golf carts.

Unauthorized access to golf carts creates several major problems for country clubs around the world. First, the stolen and/or duplicate keys allow golfers to use the golf carts without paying a rental fee. Second, because some facilities charge golf cart access on an individual rather than a per cart basis, two golfers can have access to the golf cart while only paying the rental fee for one golfer. Third, unauthorized access of golf carts increases the legal liability of the country club because the club cannot prevent unauthorized persons such as minors or highly intoxicated individuals from access to the golf carts. Finally, unauthorized use of golf carts increases the carts' maintenance costs such as washing, hours-based maintenance, battery replacement, damage repair, and wear and tear. All of the above factors result in significant revenue loss for country clubs around the world.

Inventions currently in the marketplace cannot solve the above problems. In order to prevent users of bus or gym lockers from removing and retaining locker keys for repeated future use, many lockers use a "captured" key principle. The locker key is secured in the keyhole until a user inserts payment in, for example, the form of coins. Once payment is inserted, the key is released from the keyhole and the user can lock the locker and remove the key. When the user reinserts the key to unlock the locker and gain access to his property, the key is captured by the keyhole until additional payment is inserted.

The above invention relies on the fact that the need to retrieve the property placed in the locker induces the key-holder to reinsert the key, thereby providing the opportunity for the lock mechanism to recapture the key. For golf carts, the inducement to reinsert the key will not occur until the first unauthorized access is attempted, rewarding the key-napper with at least one free use of the golf cart. Therefore, the gym locker key capture mechanism is unsuited for golf carts.

Another type of access control can be found in the protocol and mechanism used for safety deposit boxes. To open a safety deposit box, two keys, one in the possession of the safety deposit box renter and the other in the possession of a bank employee, must be used simultaneously to unlock the box. Applying this concept to golfcarts is impractical because it would require a country club employee to be present every time a golf cart is started up, thereby increasing the labor costs for country clubs.

Specialized magnetic lock and key combinations are sometimes used to prevent unauthorized copying of the key. The combination consists of a key with very small embedded magnets that can magnetically attract or repel magnetized tumbler elements in the lock. Once the appropriate tumbler elements have been attracted, the key can be rotated in the lock. Such a magnetic key cannot be easily duplicated. This concept, when applied to golf carts, would prevent renters from duplicating the keys. However, the inability to duplicate keys would only increase the number of stolen keys. Because stolen keys will continue to allow unauthorized golf cart access, not to mention requiring a costly replacement fee for each key, a magnetic lock and key combination will not give country clubs more control of their golf carts.

Finally, some country clubs control access to their golf carts by using radio controlled devices to activate or deactivate the golf carts. Although controlling golf cart access by remote control can limit unauthorized use of the carts, the radio controlled mechanism may break down easily. Furthermore, in order to prevent unauthorized access to golf carts, the country club must first know that the golf cart is being used by unauthorized personnel before it can deactivate the golf cart. In other words, the access control is not immediately effective. Because country clubs cannot immediate prevent a golf cart from being used by unauthorized personnel, radio controlled devices do not provide ideal golf cart access control.

SUMMARY OF THE INVENTION

It is an object of the present invention to provide a novel single access control system that allows an authorized individual a single time access to a locked or deactivated device.

It is another object of the present invention to provide a single access control system that will physically capture a user-key so that the key can only be removed by using a special key removal tool.

It is another object of the present invention to provide a single access control system in which the user-key is difficult to duplicate due to both the mechanical tolerances of the key and the varied combination of magnetic polarity and field strength of the magnets embedded in the key.

It is another object of the present invention to provide single access control system that requires a special key removal tool that is difficult to duplicate due to mechanical tolerances of the key removal tool and the varied combination of magnetic polarity and field strength of the magnets embedded in the key-removal tool.

It is a further object of the present invention to provide specially coded user-keys that permits tracking golf cart usage back to the last user.

It is another object of the present invention to provide user-keys that are specially coded so as to enable inventory tracking by the owner of the single access control system.

It is a further object of the present invention to provide user-keys that are physically sized and shaped to help deter theft and accidental pocketing.

It is a further object of the present invention to provide specially coded user-keys that will reduce cross-facility compatibility and potential misuse by adjacent facility renters, staff, or other individuals.

In satisfaction of these and related objectives, Applicant's present invention provides a novel method and mechanism that allows a single access to a device. Currently, Applicants's invention is being used on golf carts only.

Applicant's invention, the single access control system and method, has three major components: the user-key, the control unit, and the combination removal and staging key.

The user key comprises of a flat, steel cap perpendicularly attached to a generally elongated body. The elongated body is irregularly shaped in cross section to allow differently shaped keys to reduce cross facility compatibility. To prevent further cross facility compatibility, the size and shape of the steel cap can also be varied. User-key is larger than conventional metal keys to prevent accidental pocketing.

A plurality of magnets are embedded along the longitudinal axis of the elongated body of the user-key in a certain orientation and spacing such that, when the user-key is inserted into the control unit, the magnets line up with a plurality of hall-effect sensors located in the control unit. Furthermore, a notch is located near the distal end of the user key so that, when the user-key is inserted into the key receptacle, the notch provides a place for the user-key capture-plunger (to be described in the following paragraphs) to latch on and secure the user-key to the control unit, thus preventing unauthorized removal of the user-key.

The control unit comprises a generally flat face plate, a receptacle for key insertion, a leaf spring-capture-plunger assembly, a mechanism used to electronically activate the locked device (in the preferred embodiment a relay to activate the golf cart), a circuit board, and two sets of hall-effect sensors.

When properly installed, the face plate of the control unit is the only surface that is seen by the user. A base plate is attached generally perpendicularly to the back side of the face plate. The appropriate electrical circuit used in operating the control unit is imprinted in a circuit board attached to the base plate. A plurality of electrical devices such as transistors and resistors are attached to the circuit board. Furthermore, two sets of hall-effect sensors, comprised of a plurality of sensors per set, are also attached to the circuit board. One set of hall-effect sensors is located directly behind the face plate while the other set of hall-effect sensors is located against the side surface of the key receptacle facing towards the circuit board.

The key receptacle is located at one side of the control unit. The opening of the receptacle is located at the surface of the face place, and the body of the receptacle extends some distance away from the face plate. The inside perimeter of the key receptacle is irregularly shaped to conform to the outside contours of the user-key so that, when user-key is inserted into the key receptacle, user-key fits snugly inside the key receptacle. Finally, a small, generally circular hole is drilled near the end of the key receptacle farther from the face plate, on the same side as the hall-effect sensors.

A leaf spring is flexibly attached to the side surface of the key receptacle facing towards the circuit board. The leaf spring is a thin, flexible piece of material generally made of plastic. In the preferred embodiment, the leaf spring is roughly shaped like an axe, with the handle portion attached to the key receptacle at the end nearer to the face plate and with a generally circular hole drilled in the approximate center of the axe head portion. In future embodiments, the location and geometry of the spring function may vary to meet unique physical requirements.

A user-key capture-plunger floats freely within a solenoid. The user-key capture-plunger is secured to and extends through the generally circular hole located in the axe head portion of the leaf spring and is removably inserted into the circular hole drilled on one side of the key receptacle. This user-key capture-plunger is pushed out of the hole at the side of the key receptacle when a user-key is inserted. When the notch of the user-key lines up with the hole at the side of the key receptacle, the user-key capture-plunger then springs back into place into the key receptacle with the aide of the leaf spring. The user-key capture-plunger thus captures the user-key and prevents key removal without the proper key removal instrument.

In future embodiments, the circuit board may be potted solid to prevent corrosion brought about by the golf cart's constant exposure to the outside environment.

In the preferred embodiment, the staging key and the removal key are combined into one "L" shaped unit called the combination removal and staging key. However, in future embodiments, the staging key and the removal key may be separately maintained. The staging key is generally elongated in shape and can have a cross section of the same size and shape as the cross section of the user-key or can have a cross section smaller than the cross section of the user-key. However, the staging key lacks the notch at the end of the user-key, and thus can be inserted and removed at will, without the user-key capture-plunger preventing the removal of the staging key. A plurality of magnets, corresponding generally in location, polarity, and field strength as the user-key, are embedded into the staging key. In the preferred embodiment, where the present invention is used for golf carts, the staging key is given to caddies so that they may drive the golf cart to the renters, whereupon the staging key is removed and the user-key inserted, thus readying the golf cart for rental use.

The removal key, which is attached to the staging key in the preferred embodiment, is also generally rectangular in shape. Unlike the user-key and the staging key, however, the removal key is rectangular and larger in cross section. Thus, the removal key will never be mistakenly inserted into the key receptacle. A plurality of magnets possessing a variety of polarities and field strengths are embedded into the removal key so that, when lined up with the plurality of hall-effect sensors located immediately behind the face plate, the hall-effect sensors will cause the release of the user-key capture-plunger so that the user-key can be removed. In addition to the magnets positioned to activate the hall-effect sensors, the removal key also contains a magnet to capture the user-key. The user-key has a flat top that is made of iron or steel. In the preferred embodiment, the top is made of steel. As the removal key is passed over the steel cap of the user-key, and as the hall-effect sensors cause the release of the user-key, the user-key is pulled out of the key receptacle by the magnetic attraction between the steel cap and the magnet embedded in the removal key.

The present invention, in its preferred embodiment, is installed by first removing the original golf cart key-switch assembly. Then, the control unit of the present invention is inserted into the same place left empty by the prior art unit by connecting the electrical units of the present invention to the battery pack used to power the golf carts and by physically securing the face plate to the golf cart. Twelve volts of direct current are needed to operate the present invention.

Once the present invention is installed, the renter of the golf cart obtains a properly encoded user-key after paying the rental fee. To operate the golf cart, the user-key is inserted into the key receptacle of the control unit. Once the key is properly inserted, the user-key capture-plunger secures the key in the key receptacle so that the user-key cannot be removed except by a specially coded removal key. When the user-key capture-plunger captures the user-key, the magnets in the user-key are properly aligned with the hall-effect sensors located next to the key receptacle. Magnetic interaction between the magnets in the user-key and the hall-effect sensors activates the electrical circuit in the control unit which, in turn, activates the golf cart power system. The golf cart is now ready for use.

At the end of the rental time, the golf cart is returned to the club house with the user-key still attached to the golf cart. A caddy now can remove the user-key by using the removal key. Proper use of the removal key involves passing the removal key in front of the face plate and allowing the magnets embedded in the removal key to interact magnetically with the hall-effect sensors located behind the face plate. These hall-effect sensors cause a circuit to be activated so that the user-key capture-plunger is magnetically pulled back from its resting position partially inside the key receptacle. Once pulled back, the user-key capture-plunger can no longer prevent the removal of the user-key. The magnet embedded in the removal key and located directly over the steel cap now magnetically attracts the steel cap out of the key receptacle and thus removes the user-key from the key receptacle.

The staging key can be used when the caddy drives the golf cart from one place to another for maintenance purposes or when the caddy brings the golf cart from the garage to the individual who rented the golf cart. The staging key functions just like the user-key except it does not require a removal key to remove it from the control unit.

BRIEF DESCRIPTION OF THE DRAWINGS

FIG. 6 is a side view of the user-key.

FIG. 6A is a partial cross section view of the proper placement of the user-key in the key receptacle immediately prior to the user-key's capture by user-key capture-plunger.

FIG. 7 is a partial cross section view of the user-key, key receptacle, and user-key capture-plunger assembly after user-key has been properly inserted and captured.

DETAILED DESCRIPTION OF THE PREFERRED EMBODIMENT

Applicant's invention can be used on any device for which locks and keys are used to limit access. However, because Applicant has only implemented the current invention on golf carts as of the time of this application, the following detailed description of the preferred embodiment is for golf carts only.

Figure 1:
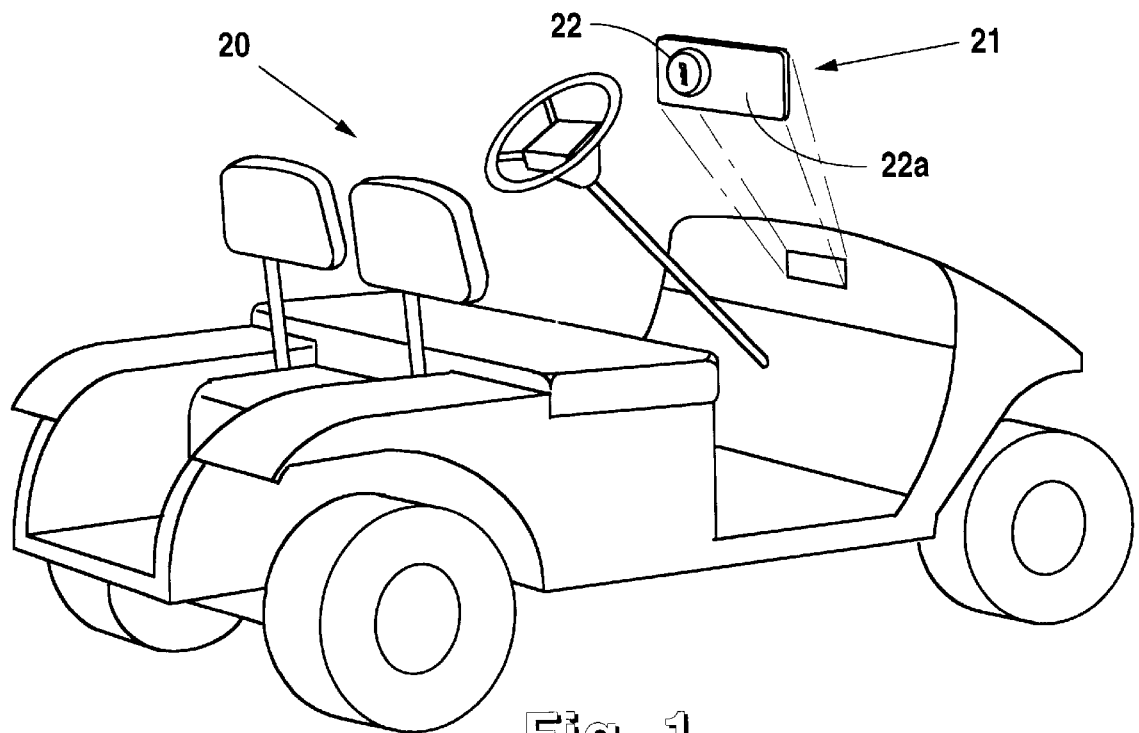
FIG. 1 is a perspective view of the prior art golf cart in its environment, with the prior art golf cart activation module enlarged for ease of identification.

FIG. 1 shows the prior art golf cart key-switch assembly 21 installed in golf cart 20. From the user's perspective, only key switch 22 and face plate 22a can be seen when operating golf cart 20.

Figure 2:
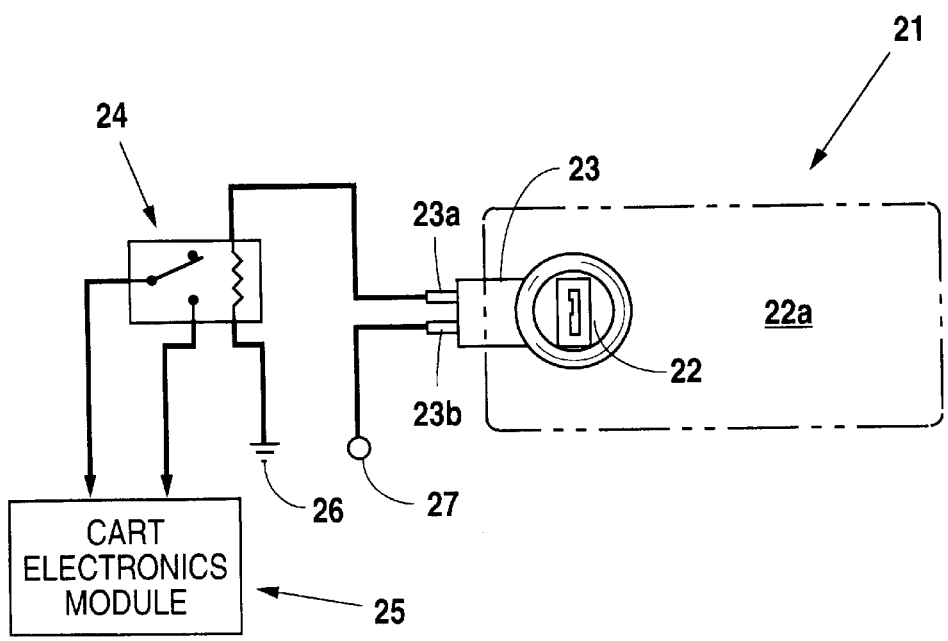
FIG. 2 is an electrical schematic of the prior art golf cart key-switch assembly.

FIG. 2 is an electrical schematic of the prior art golf cart key-switch assembly 21. Golf cart key-switch assembly 21 consists of key switch 22 embedded in face plate 22a. Electrical switch 23 is attached to key switch 22 and is oriented generally perpendicularly to face plate 22a. Connectors 23a and 23b connect electrical switch 23 to the electrical circuits of golf cart 20. Connector 23a links electrical switch 23 to relay 24. Relay 24 controls the activation of golf cart electronics. Relay 24 is connected to golf cart electronics module 25 and ground 26. Connector 23b links electrical switch 23 to power source 27, which, in the case of golf carts, is a 36 volt DC battery assembly.

Figure 3:
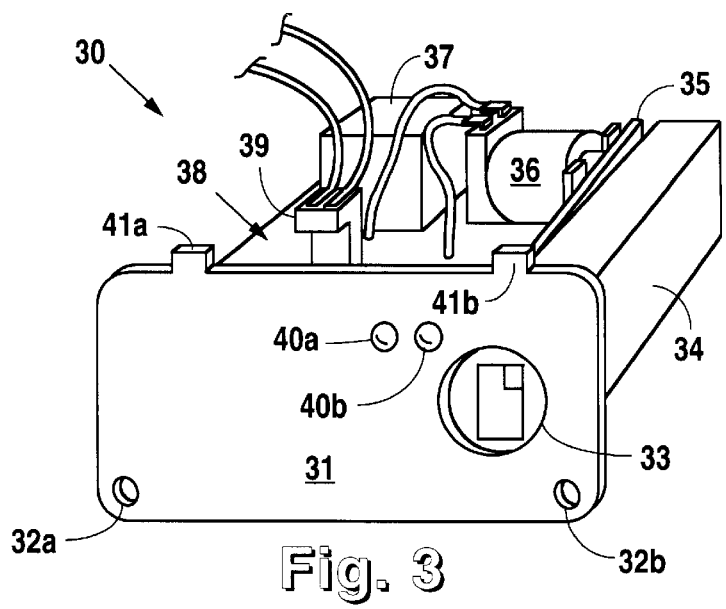
FIG. 3 is a frontal perspective view of the control unit of the preferred embodiment.

Turning to the present invention, FIG. 3 shows a front perspective view of control unit 30 of the preferred embodiment of single access control system. Control unit 30 consists of various subcomponents, with the major subcomponents being face plate 31, keyhole 33, key receptacle 34, leaf spring 35, solenoid 36, relay 37, circuit board 38, and power connector 39. With the exception of face plate 31, detailed descriptions of each subcomponent will be described in later sections of this detailed description. A detailed description of face plate 31 will be given at this time.

Face plate 31 is a generally rectangular plate made of metal, plastic, or any other hard material. Two round openings, 32a and 32b, are drilled into the lower portion of face plate 31 so that face plate 31 can be secured to golf cart 20. Further, two mounting ears, 41a and 41b, are located on the upper part of face plate 31. Mounting ears 41a and 41b facilitate the installment of control unit 30 onto golf cart 20. In the preferred embodiment, keyhole 33 and key receptacle 34 are located on one side of control unit 30. However, so long as the design elements described in the following pages are met, keyhole 33 and key receptacle 34 can be located anywhere or in any relative position on face plate 31.

Two key control indicators, 40a and 40b, are located on face plate 31. In essence, key control indicators 40a and 40b are LEDs used to indicate the activation and deactivation of golf cart 20. In the preferred embodiment, when user-key 100 (as will be subsequently described) is properly inserted into key receptacle 34 and golf cart 20 is activated, one key control indicator, 40a or 40b, lights up. When removal key 112 (as will be subsequently described) is properly used for user-key 100 removal and golf cart 20 deactivation, both key control indicators 40a and 40b light up. Once user-key 100 has been removed from control unit 30, both key control indicators 40a and 40b are turned off. Although two LEDs are used in the preferred embodiment of the present invention, other means such as no display, a single LED, a liquid crystal display, or any other digital or analog display can be used to indicate the activation or deactivation of golf cart 20.

Figure 4:
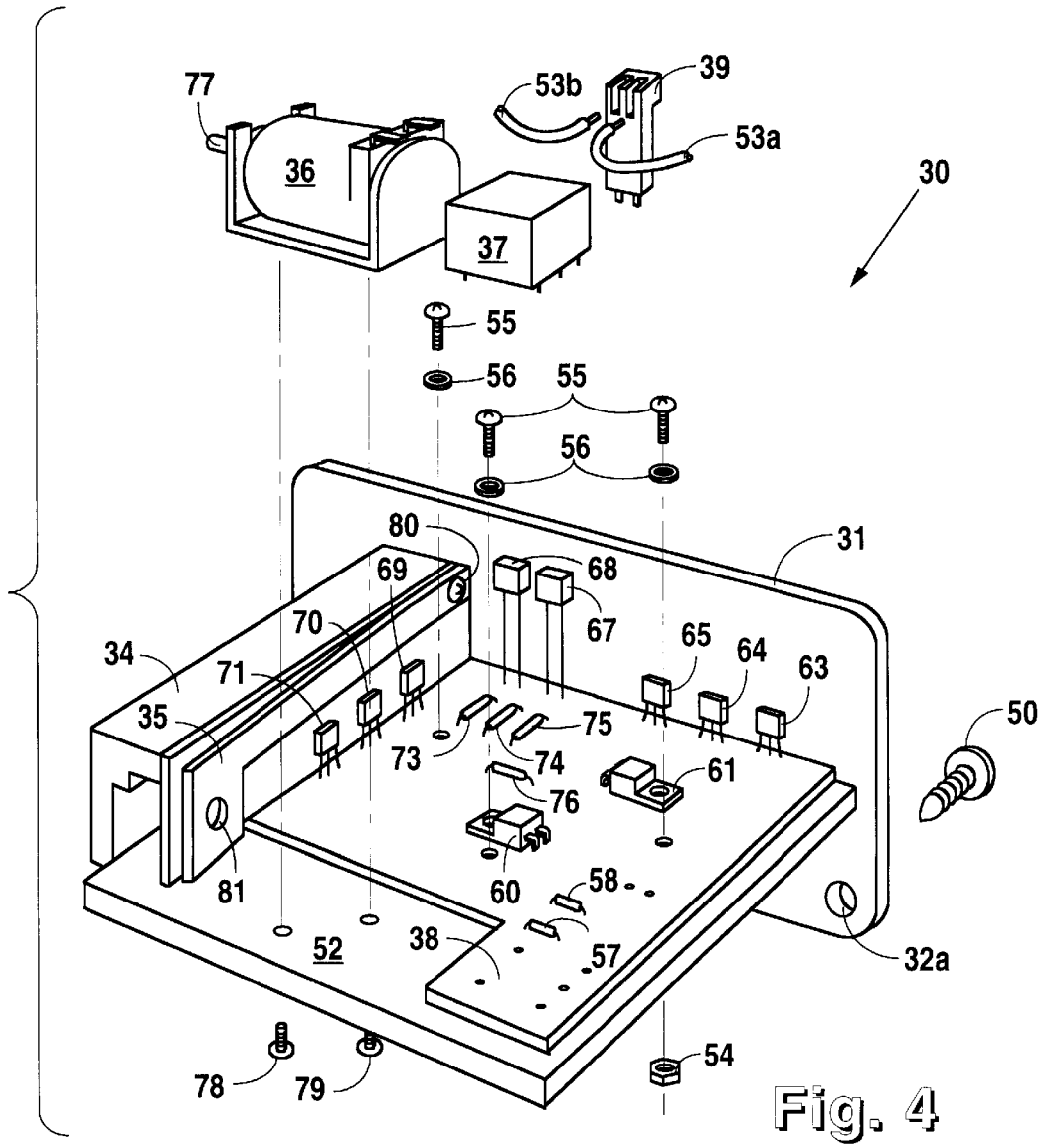
FIG. 4 is an exploded rear perspective view of the control unit of the preferred embodiment.

FIG. 4 shows an exploded rear perspective view of control unit 30. Face plate 31 is attached to golf cart 20 by any conventional fastening means. In the preferred embodiment, face plate 31 is attached to golf cart 20 by inserting screws 50 and 51 (not shown) through round openings 32a and 32b and boring screws 50 and 51 (not shown) into the instrument panel of golf cart 20. Base plate 52 is attached generally perpendicularly to the back side of face plate 31. In the preferred embodiment, the depth of base plate 52 is less than the length of face plate 31. However, as long as the design requirements disclosed in this detailed description of the invention are met, base plate 52 can be longer in depth than the length of face plate 31.

Base plate 52 provides a surface onto which circuit board 38 is attached. Although, in the preferred embodiment, circuit board 53 is attached to base plate 52 via a plurality of nuts 54, bolts 55, and washers 56, circuit board 38 can be attached to base plate 52 by glue or any other conventional means.

Figure 5:
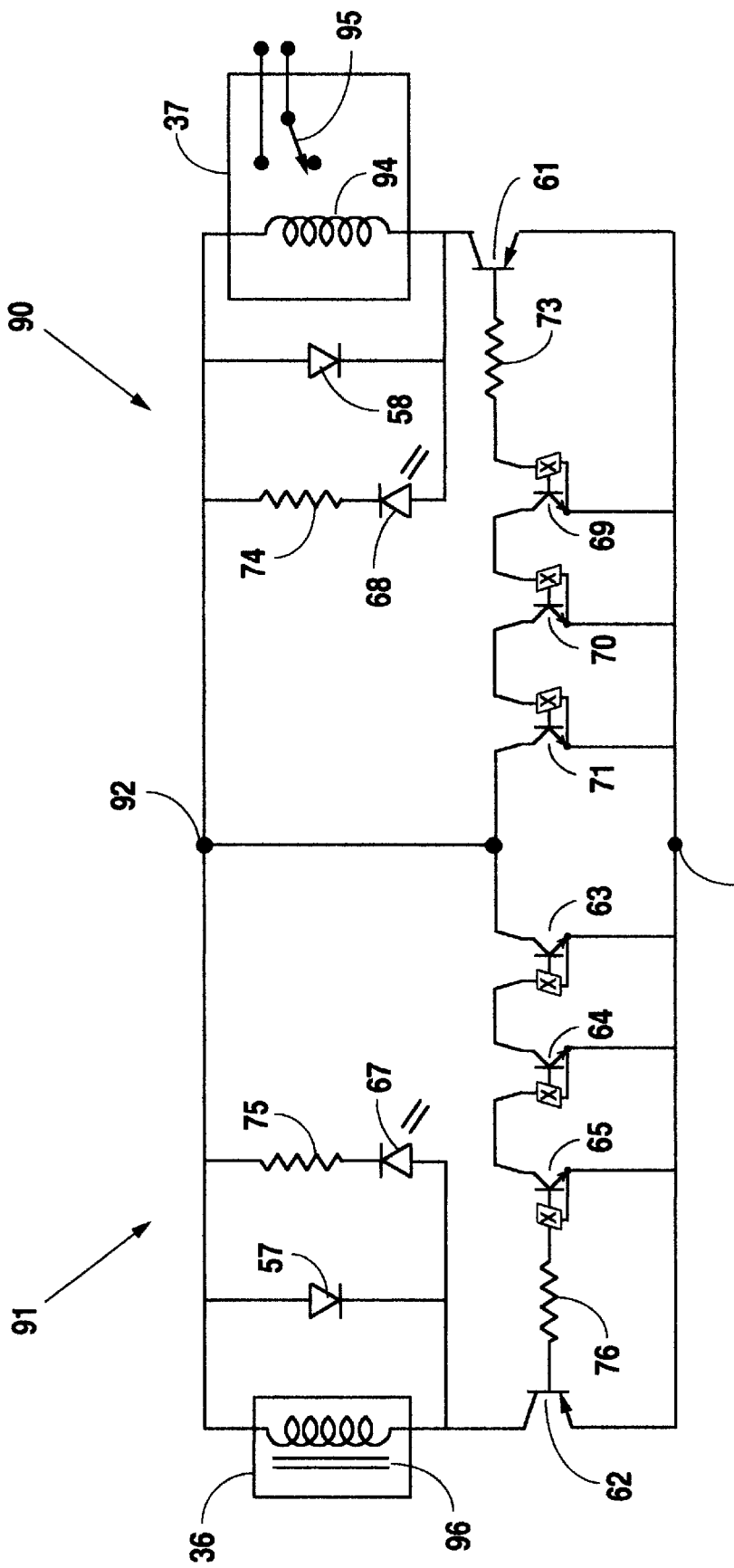
FIG. 5 is an electrical schematic of the control unit of the preferred embodiment.

Referring now to FIGS. 4 and 5 in combination, a variety of electrical components are attached to circuit board 38 by soldering or any other conventional means. The electrical components include relay 37; diodes 57 and 58; transistors 60 and 61; hall-effect sensors 63, 64 and 65; hall-effect sensors 69, 70, and 71; and resistors 73, 74, 75, and 76. Diodes 57 and 58 are flyback control diodes. Although not shown in the preferred embodiment, diodes 57 and 58 can be replaced by other conventional voltage transient suppressors, such as capacitors. Transistors 60 and 61 control solenoid 36 and relay 37, respectively. Hall-effect sensors 63, 64 and 65 are field density and polarity sensitive. They are used in the user-key 100 removal process and are located against the back side of face plate 31. Each sensor is tuned to respond to a different field density and polarity corresponding to their counterpart magnets embedded in removal key 112 (see FIGS. 8 and 9). Although three hall-effect sensors are used in the preferred embodiment, the number of hall-effect sensors can be increased or decreased as needed. LEDs 67 and 68 are used as indicators for user-key insertion and removal. Hall-effect sensors 69, 70, and 71 are field density and polarity sensitive. They are used in the golf cart 20 activation/user-key 100 (see FIGS. 6 and 6A) insertion process. Each sensor is tuned to respond to a different density and polarity corresponding to the density and polarity of its counterpart magnet in user-key 100 and staging key 111. Hall-effect sensors 69, 70, and 71 are placed against the side of key receptacle 34 facing circuit board 38. Although three hall-effect sensors are shown in the preferred embodiment, the number of hall-effect sensors can be increased or decreased as needed.

Power connector 39 is attached to circuit board 38. Power connector 39 connects control unit 30 to the power source of golf cart 20 via power cords 53a and 53b. Power connector 39 taps 12 volts of direct current from golf cart 20's battery pack.

Solenoid 36 can be attached to circuit board 53 or base plate 52 via any conventional means. In the preferred embodiment, solenoid 36 is attached to base plate 52 by using screws 78 and 79. User-key capture-plunger 77 is retractable into solenoid 36.

Key receptacle 34 can be attached to circuit board 53 or base plate 52 via any conventional means. In the preferred embodiment, key receptacle 34 is attached to base plate 52. Key receptacle 34 is a generally elongated rectangular box with an irregularly shaped inside perimeter. The inside perimeter of key receptacle 34 is irregularly shaped so that only an user-key 100 with the exact complementary irregularly shaped outside contour can fit into key receptacle 34. Thus the irregular shape of the inside perimeter of key receptacle 34 ensures proper positioning of magnets 106, 107, and 108 located in user key 100 and magnets 113, 114, and 115 located in staging key 111 prevents unauthorized access and cross facility access to golf cart 20.

Leaf spring 35 is flexibly attached to key receptacle 34. Leaf spring 35 can be attached to key receptacle 34 by any conventional means. In the preferred embodiment, leaf spring 35 is attached to key receptacle 34 by means of screw 80. Although, in the preferred embodiment, leaf spring 35 is made of a thin flexible piece of plastic, leaf spring 35 can be made of any thin flexible material. Leaf spring 35 is shaped like an axe, with the tip of the long handle portion attached to key receptacle 34 at a point near face plate 31. The axe head portion of leaf spring 35 is square shaped, with orifice 81 drilled in approximately the middle of the square. Orifice 81 allows user-key capture-plunger 77 to be secured to and passed through leaf spring 35. A second orifice 82 (not shown) is located at the side of key receptacle 34 and directly aligned with orifice 81. This second orifice 82 allows user-key capture-plunger 77 to pass though the side wall of key receptacle 34 and extend into the inside perimeter of key receptacle 34, thereby securing user-key 100 when user-key 100 has been properly inserted, while preventing user-key capture-plunger 77 from extending too far into key receptacle 34.

In alternative embodiments, the entire electrical assembly of control unit 30 may be potted solid to prevent moisture accumulation and corrosion due to the constant exposure to the outside atmosphere.

FIG. 5 shows the electrical schematic of circuit board 38. This electrical schematic diagram can be further subdivided into two major sections. Section 90 controls the golf cart starter mechanisms. Section 91 controls the user-key removal system. Voltage is applied at junctions 92 and 93.

In order for current to flow through section 90, user-key 100 must be inserted into key receptacle 34 as shown in FIG. 7. The magnetic fields in magnets 106, 107, and 108 embedded in user-key 100 activate hall-effect sensors 69, 70, and 71, respectively, thereby completing the circuit in section 90. While in the preferred embodiment relay 37 is used to maximize interchangeability with alternative golf cart activation electrics of varying voltages, polarities, and so forth, in future embodiments, the function of relay 37 may be performed by a sold-state or other electro-mechanical component best suited to a specific cart electronic design. Once the circuit in section 90 is completed, current flows between junctions 92 and 93 to relay 37. Relay 37 primarily consists of inductor 94 and key switch 95. The magnetic effects of inductor 94 activates key switch 95, which in turn activates the electrical systems of golf cart 20 via relay 24, thereby allowing someone to drive golf cart 20. Key switch 95 remains in the "on" position as long as current flows through inductor 94. Diode 58 is connected in parallel to relay 37 and reduces electrical surges when user-key 100 is removed. Resistor 74 and LED 68 are connected in series with respect to each other, but are connected in parallel with respect to diode 58 and relay 37 and act to signal the completion of circuit section 90, the proper insertion of user-key 100, and the activation of golf cart 20. Finally, electrical current is controlled by passing through transistor 61, which is switched on or off by current flowing through resistor 73 and hall-effect sensors 69, 70, and 71.

Section 91 controls the deactivation of golf cart 20. When removal key 112 (see FIGS. 9 and 9A) is properly positioned in front of face plate 31, the magnetic fields of magnets 116, 117, and 118 embedded in removal key 112 activate hall-effect sensors 73,64 and 65, respectively, and allow current flow through resistor 76 to transistor 62. This switches on transistor 62 to allow electrical current flow through solenoid 36, which mainly consists of magnetic core inductor 96. Magnetic core inductor 96 magnetically pulls user-key capture plunger 77 out of notch 104, thereby releasing user-key 100. Diode 57 is connected parallel to solenoid 36 and reduces electrical current from flowing back towards junction 92 when current stops following through inductor 96. Resistor 75 and LED 67 are connected in series with respect to each other and in parallel with respect to diode 57 and solenoid 36. LED 67 signals the correct placement of removal key 112 and the completion of circuit section 91. Finally, electrical current is controlled by transistor 62 which is switched on or off by, resistor 76, and hall-effect sensors 63, 64, and 65.

The completion and activation of the circuit in section 91 leads to the deactivation of section 90. When solenoid 36 causes user-key capture-plunger 77 to release user-key 100, user-key 100 can then be removed. When user-key 100 is retracted from key receptacle 34, magnets 106, 107, and 108 no longer cause hall-effect sensors 69, 70, and 71 to complete the circuit in section 90. When current no longer flows through relay 36, key switch 95 automatically is returned to the "off" position, thereby shutting down the electrical system of golf cart 20.

Although the preferred embodiment of the present invention uses magnets and hall-effect sensors to complete the above described circuit, other methods of completing the above circuit can also be used. Conventional magnetic key cards, optical codes, or touch memory, along with their respective code reader, can be used to complete the above described circuit. Further, any conventional means, whether mechanical, electrical, or a combination of both, can be used to capture magnetic key cards, optical codes, or touch memory to prevent renters from using the magnetic key cards, optical codes, or touch memory more than once. Although it is contemplated that the means for preventing renters from using the key cards or bar codes more than once is through a magnetic key card or bar code capturing key receptacle, any means that will prevent renters from using golf cart 20 more than once can be adapted to the present invention. When properly implemented, magnetic key cards, optical codes, or touch memory can further regulate access to golf cart 20, the number of rounds of golf the user(s) are authorized to use golf cart 20, and the length of time the user(s) are authorized to use golf cart 20. When the number of renters exceeds that which has been authorized or when the rounds played exceeds the number for which rental fee has been paid, or when the allotted time has expired, golf cart 20 is automatically shut down. All of the above will give golf clubs better control to the access of golf carts, thereby increasing their revenue.

FIG. 6 shows a side view of user-key 100. In the preferred embodiment, steel cap 101 is circular in shape. However, to prevent cross-facility compatibility, steel cap can be of different shapes and sizes. User-key 100 has a generally elongated body perpendicularly attached to a flat steel cap 101. The body of user-key 100 has a proximate end 102 and a distal end 103, ending in tip 105. Notch 104 is cut near the distal end 103 of user key 101. Notch 104 extends cross sectionally some distance into the body of user-key 100. The body of user-key 100 has an irregularly shaped cross section that can snugly fit into the irregularly shaped inside perimeter of key receptacle 34. The cross section of user-key 100 is reduced at distal end 103 from notch 104 to tip 105 by means of a cant 105a. A plurality of magnets—magnets 106, 107, and 108 in the preferred embodiment—are embedded into the body of user-key 100, along its longitudinal axis. Magnets 106, 107, and 108 differ in polarity and field strength in order to deter unauthorized copying of user-key 100. For future embodiments of this invention, a greater number of magnets can be embedded into user key 100 to further complicate and prevent unauthorized copying. As the number of magnets embedded inside of user-key 100 increases, the number of hall-effect sensors in control unit 30 should increase accordingly. However, in future embodiments, the number of hall-effect sensors do not have to precisely match the number of magnets embedded in user-key 100.

A number of other features of user-key 100 can reduce cross facility compatibility, prevent accidental pocketing, and allow inventory tracking of user-key 100. Cross facility compatibility—i.e. using keys from one country club at another country club—can be reduced or prevented by, for example, varying the size and shape of key hole 33 and steel cap 101, and/or by varying the cross section of user-key 100 and key receptacle 34. Accidental pocketing of user-key 100 can be prevented by enlarging the size of user-key 100, making it too bulky to carry in one's pocket. Finally, inventory tracking of user-key 100 can be achieved by recording the alphanumeric codes located in each user-key 100.

FIG. 6A shows user-key 100 inserted into key receptacle 34 immediately prior to being captured by user-key capture-plunger 77. As user-key 100 is pushed into key receptacle 34, tip 105 comes into contact with user-key capture-plunger 77. User-key capture-plunger 77 is pushed away from key receptacle 34 by the distal end 103 of user-key 100 across the cant 105a between tip 105 and notch 104. When user-key 100 is completely inserted into key receptacle 34, notch 104 lines up with user-key capture-plunger 77. Because user-key capture-plunger 77 is attached to leaf spring 35, user-key capture-plunger 77 springs back into key receptacle 34 to rest snugly inside notch 104. In this position, user-key capture-plunger 77 prevents golf cart renters from removing user-key 100.

As shown in FIG. 7, when properly inserted, user-key 100 fits snugly into key receptacle 34. Similarly, user-key capture-plunger 77 should fit snugly inside notch 104. In addition, magnets 106, 107, and 108 should line up with hall-effect sensors 69, 70, and 71. Finally, the outside surface of steel cap 100 rests evenly with the outside surface of face plate 31. This arrangement discourages renters from forcibly prying user-key 100 out of key receptacle 34.

Figure 8:
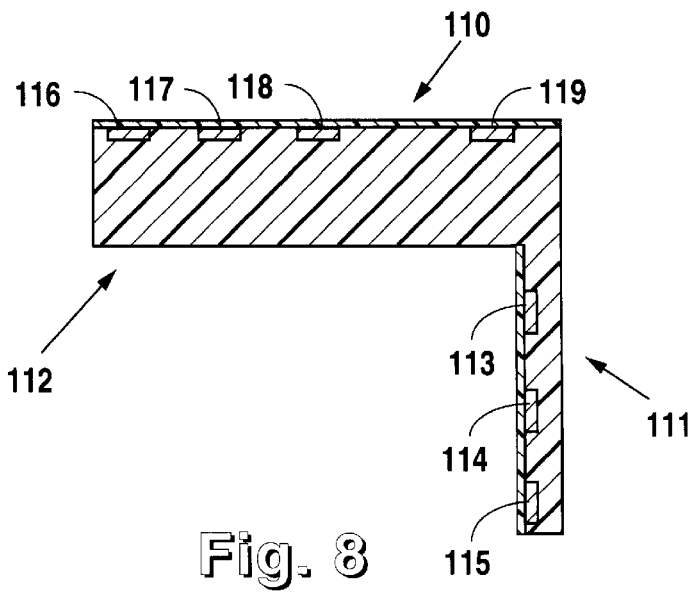
FIG. 8 is a cross sectional view of the combination removal and staging key.

FIG. 8 shows combination removal and staging key 110. Combination removal and staging key 110 comprises of staging key 111 and removal key 112 attached together in the shape of an "L." Removal key 112 forms the vertical arm of the "L" and staging key 110 forms the horizontal arm of the "L." A plurality of magnets-the precise number, position, polarity, and field strength generally corresponding to the number, position, field strength, and polarity of magnets embedded in user-key 100—are embedded in the staging key 111, on the side facing the bend of the "L." In the preferred embodiment, three magnets—113, 114, and 115—generally similar imposition, field strength, and polarity to magnets 106, 107, and 108 are embedded in staging key 111. Likewise, a plurality of magnets—in the preferred embodiment magnets 116, 177, and 118—capable of activating hall-effect sensors 63, 64, and 65 are embedded in removal key 112 on the side facing away from the bend of the "L." In addition, magnet 119 is embedded in removal key 112 in order to magnetically attract steel cap 101 (and the entire user-key 100) after user-key 100 is released by user-key capture-plunger 77.

The length and thickness of removal key 112 can vary depending on the number of embedded magnets. However, although the length of staging key 111 can vary, it is designed so that it cannot be captured by user-key capture plunger 77. Furthermore, in order to be able to inset staging key 111 into key receptacle 34, the cross section of staging key 111 can never be thicker than user-key 100. The cross section of staging key 111 can either match the outside contours of user-key 100 or it can be so much smaller than the inside contours of key receptacle 34 that it can be inserted into key receptacle 34 despite the fact that its outside contour does not match the inside contour of key receptacle 34. In the preferred embodiment, the cross section of staging key 111 is rectangular and is smaller than the cross section of user-key 100.

Figure 9:
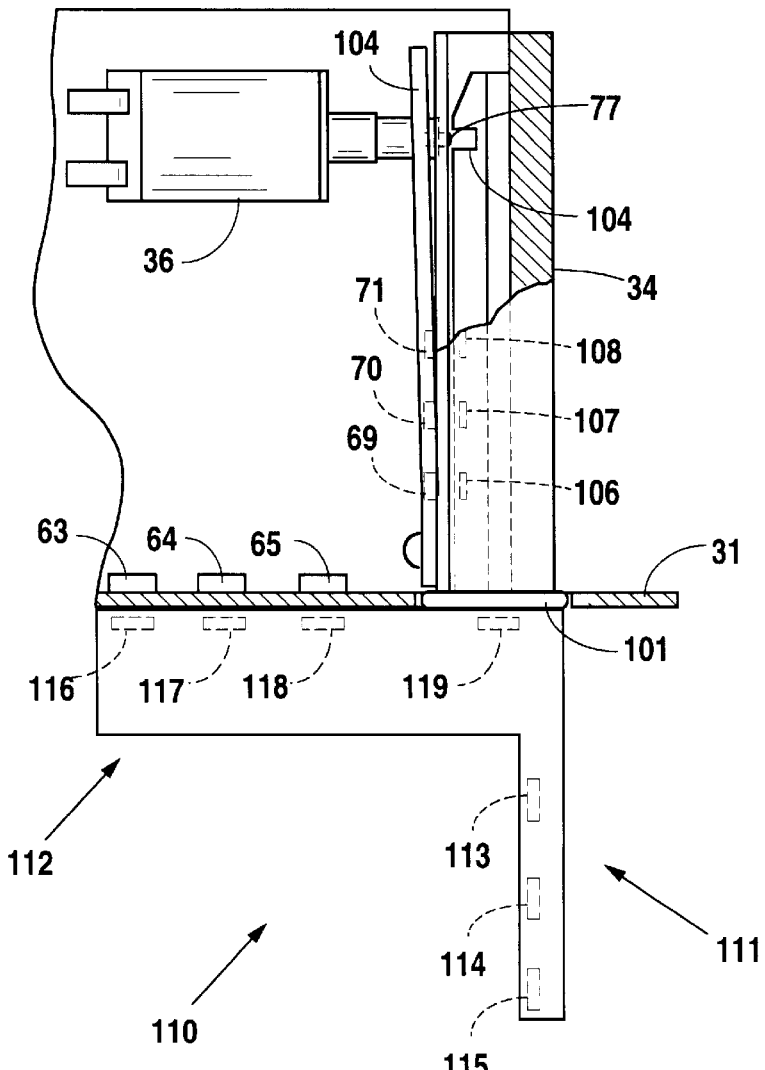
FIG. 9 is a partial cross section view of the proper placement of the combination removal and staging key when used to remove the user-key.

FIG. 9 shows the proper usage of combination staging and removal key 110 to remove user-key 100 from control unit 30. Generally, in order to remove user-key 100, removal key is placed in front of face plate 31. When embedded magnets 116, 117, and 118 are properly lined up with hall-effect sensors 63, 64, 65, respectively, solenoid 36 is activated and user-key capture-plunger 77 is pulled away from notch 104 of user-key 100. User-key 100 is now no longer held in key receptacle 34 by user-key capture-plunger 77 and can be removed at any time.

Figure 9A:
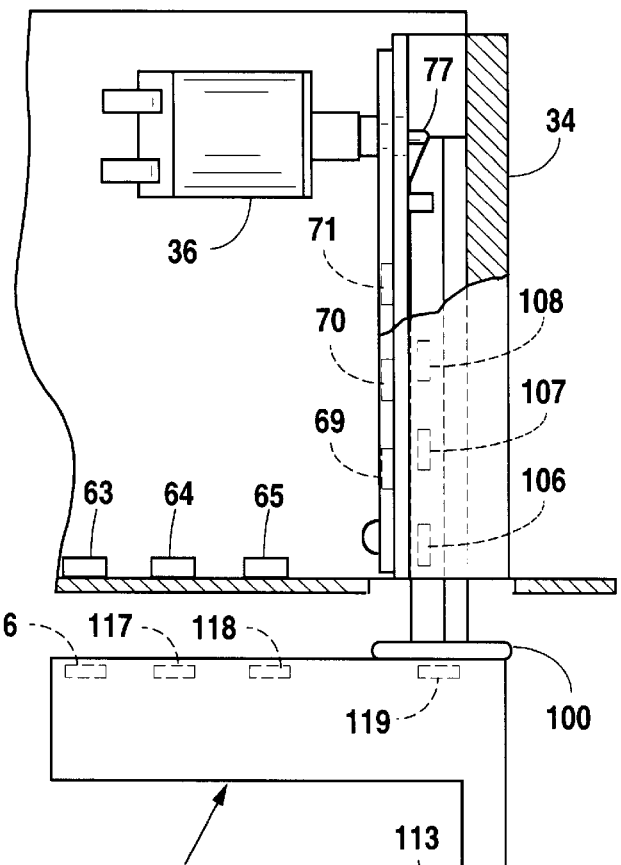
FIG. 9A is a partial cross section view of the proper method of removing the user-key from the key receptacle after the user-key is released by user-key capture-plunger.

When magnets 116, 117, and 118 are properly aligned with hall-effect sensors 63, 64, 65, magnet 119 is also aligned with steel cap 101. As shown in FIG. 9A, after user-key capture-plunger 77 releases user-key 100, magnet 119 can pull user-key 100 out of key-receptacle 34 via the magnetic attractive forces between magnet 119 and steel cap 101.

Although only three magnets and three hall-effect sensors are used in the preferred embodiment, future embodiments of the present invention can include a larger number of magnets, each with a different polarity and field strength, and a suitable—but not necessarily equal—number of hall-effect sensors adjusted to respond to the precise polarity and field strength of its counterpart magnet.

Figure 10:
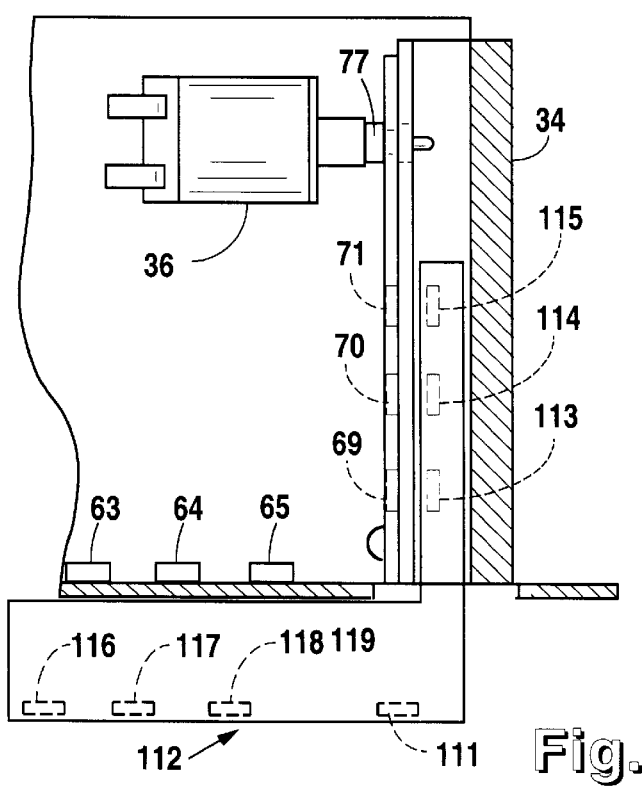
FIG. 10 is a cross section view of the proper placement of the combination removal and staging key when the staging key is used to activate the golf cart.

FIG. 10 illustrates the correct placement of staging key 111. When inserted into key receptacle 34, magnets 113, 114, and 115 line up with hall-effect sensors 69, 70, 71, respectively, and golf cart 20 is activated. Since staging key portion 111 does not extend beyond user-key capture-plunger 77, staging key 111 is not captured once it is inserted into key receptacle 34. Therefore, staging key 111 can be freely removed without the aide of removal key 112.

When staging key 111 is inserted into key receptacle 34, the position of removal key 112 is such that magnets 116, 117, 118, and 119 are facing away from face plate 31. Such a configuration prevents key removal circuits from being accidentally activated.

A conventional golf cart 20 can easily be retrofitted with the present invention. First, the original golf cart key-switch assembly 21 requiring a conventional metallic key is disconnected and removed from golf cart 20. Second, control unit 30 of the present invention is installed into golf cart 20 by connecting power connector 39 to a 12 volt DC power source provided by the battery pack of golf cart 20. Then, control unit 30 is affixed to golf cart 20 in the location vacated by the original golf cart key-switch assembly 21 by using, for example, screws 50 and 51 (not shown) or any other conventional device generally used to secure one object to another.

Once control unit 30 is installed, golf cart 20 can only be activated by a properly coded user-key 100 or by staging key 111. A plurality of magnets, each differing in polarity and field strength, are embedded in user-key 100. A duplicate set of magnets, with each magnet generally matching in location, polarity, and field strength to the magnets embedded in user-key 100, are embedded in staging key 111. User-key 100 is given to the golf cart renter(s) after proper rental fees have been paid and the identity of the renter(s) properly recorded. Golf cart 20 is then activated by inserting staging key 111 into key receptacle 34 and brought to the renter(s) by an authorized person. The authorized person deactivates golf cart 20 and removes staging key 111 from key receptacle 34 before turning the control of golf cart 20 over to the renter(s). In order to activate golf cart 20, the renter(s) must insert user-key 100 into key receptacle 34. Once inserted, user-key 100 is captured in key receptacle 34 and can no longer be removed by the renter(s). Thus, the renter(s) cannot remove user-key 100 and gain access to golf cart 20 in the future without first paying a rental fee. Furthermore, if the renter(s) somehow damages golf cart 20, other property, or causes another some injury, his/her/their identity can be retraced via user-key 100 and he/she/they or any other unauthorized individual he/she/they allowed to use golf cart 20 can be held accountable for the damage(s).

After the renter(s) finish(es) the round of golf, golf cart 20 is returned to the clubhouse, and authorized personnel can inspect golf cart 20 to ensure no damage was done during the rental period. After such inspection, user-key 100 can be removed from key receptacle 34 by using removal key 112.

Authorized personnel can access golfcart 20 for maintenance purposes by using user-key 100 or staging key 111.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A method of retrofitting and operation of a control unit for golf carts, said control unit being operable by a specifically designed user key and a combination staging/removal key, said method of retrofitting and operation consisting of the following steps:

removing a golf cart key-switch assembly from said golf cart;

connecting said control unit to a voltage source on said golf cart;

fastening said control unit into an opening from which said golf cart key-switch assembly was removed;

inserting said specially designed user key into a matching key receptacle;

capturing said specially designed user key in said matching key receptacle;

energizing said control circuit during said inserting step to cause current flow through a relay to allow operation of said golf cart by a user; and removing said specially designed user key by said combination staging/removal key eliminating said capturing step.

2. The method of retrofitting and operation of a control unit for golf carts as given in claim 1 having a first step of disconnecting said golf cart key-switch assembly from said voltage source on said golf cart.

3. The method of retrofitting and operation of a control unit for golf carts as given in claim 2, said capturing step includes spring loading of a plunger to move said plunger into engagement with a notch in said specially designed user key.

4. The method of retrofitting and operation of a control unit for golf carts as given in claim 3 wherein said energizing step includes matching a first set of magnets on said specially designed user key with a first set of Hall effect transistors to allow said current flow through said relay.

5. The method of retrofitting and operation of a control unit for golf carts as given in claim 4 wherein said removing step includes matching a second set of magnets on said combination staging/removal key with a second set of Hall effect transistors to activate a solenoid to remove said plunger from engagement with said notch.

6. The method of retrofitting and operation of a control unit for golf carts as given in claim 5 includes in said removing step magnetically attracting said specially designed user key by removal magnet in said combination staging/removal key.

7. The method of retrofitting and operation of a control unit for golf carts as given in claim 1, a second inserting step wherein said combination staging/removal key is inserted into said matching key receptacle, said second inserting step causing said energizing step to allow operation of said golf cart by authorized personnel without said capturing step.

8. A control circuit for a single use access device comprising:
 a voltage source;
 a relay transistor;
 a first plurality of Hall effect transistors connected in series between said voltage source and a base of said relay transistor;
 a relay in series with said relay transistor and said voltage source;
 user key having first magnets therein for aligning with said first plurality of Hall effect transistor to allow current flow therethrough to switch ON said relay transistor and said relay to allow said single use;
 a solenoid transistor;
 a second plurality of Hall effect transistors connected in series between said voltage source and a base of said solenoid transistor;
 a solenoid in series with said solenoid transistor and said voltage source; and
 removal key having second magnets therein for aligning with said second plurality of Hall effect transistors to allow current flow therethrough to switch ON said solenoid to move a solenoid plunger, said solenoid plunger holding said user key in position until said solenoid is turned ON.

9. The control circuit for a single use access device as given in claim 8 having diodes across said relay and said solenoid to reduce transient voltages.

10. The control circuit for a single use access device as given in claim 9 further having a first indicator light across said relay to signal when said single use is occurring.

11. The control circuit for a single use access device as given in claim 10 further having a second indicator light across said solenoid to signal when said user key can be removed.

12. A single access control apparatus that may be used to operate golf carts, said single access control apparatus having a source of power and comprising:
 a face plate;
 a base plate attached to and behind said face plate;
 a key receptacle attached to and extending rearward from said face plate and mounted on said base plate;
 control circuit located on said base plate, said control circuit being connected to said source of power;
 user key for insertion in said key receptacle, both being a matched male/female connection;
 spring loaded plunger for engaging a notch in said user key upon insertion into said key receptacle;
 removal key with first magnets in said removal key for aligning with first magnetically sensitive elements of said control unit to move said spring loaded plunger from engagement with said notch; and
 said control circuit having a magnetically operated first sub-circuit which activates said control circuit upon aligning second magnets in said user key with second magnetically sensitive elements of said first sub-circuit.

13. The single access control apparatus as given in claim 12 wherein said user key is flush with said face plate when inserted, said user key being removable by a magnet in said removal key.

14. The single access control apparatus as given in claim 13 have as part of said control circuit low power indicators for signaling when single access is occurring.

15. A golf cart for carrying golfers and their golfing equipment, said golf cart comprising:
 a frame;
 a seat mounted on said frame;
 a plurality of at least three wheels for supporting said frame;
 a power source mounted on said frame;
 steering means attached to at least one of said wheels for steering said golf cart;
 acceleration means connected between said power source and at least one of said wheels to control speed of said golf cart;
 breaking means connected to at lease on of said wheels for stopping said golf cart;
 a single use control apparatus connected between said power source and said acceleration means, said single use control apparatus comprising: a magnetically activated control circuit for turning ON or OFF said power source; and a first coded key for matching said magnetically activated control circuit upon insertion of said first coded key in a key slot; and
 a magnetically encoded removal key which matches said magnetically activated control circuit to remove said first coded key once said first coded key is secured in said key slot by a capturing means.

16. The golf cart as described in claim 15 further comprising an encoded removal key which is used to remove said first coded key once said first coded key is inserted and secured in said key slot, said encoded removal key comprising:
 a body having at least one flat surface wherein said flat surface can come into contact with a face plate attached to said single use control apparatus;
 second magnets embedded in said flat surface of said body of said encoded removal key whereby said second magnets activate a spring loaded plunger to disengage said spring loaded plunger from a notch and allowing said first coded key to be removed; and
 a removal magnet embedded in said flat surface of said body, said removal magnet generally located separate and apart from said second magnets and magnetically attracting a metal cap to remove said first coded key out of said key slot.

* * * * *